US011590929B2

(12) United States Patent
Bhattacharya et al.

(10) Patent No.: US 11,590,929 B2
(45) Date of Patent: Feb. 28, 2023

(54) SYSTEMS AND METHODS FOR PERFORMING COMMANDS IN A VEHICLE USING SPEECH AND IMAGE RECOGNITION

(71) Applicant: NVIDIA Corporation, Santa Clara, CA (US)

(72) Inventors: Sumit Bhattacharya, Maharashtra (IN); Jason Conrad Roche, Santa Clara, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/867,395

(22) Filed: May 5, 2020

(65) Prior Publication Data

US 2021/0347328 A1    Nov. 11, 2021

(51) Int. Cl.
*G06F 21/32* (2013.01)
*B60R 25/01* (2013.01)
(Continued)

(52) U.S. Cl.
CPC ............ *B60R 25/01* (2013.01); *B60R 25/257* (2013.01); *B60R 25/305* (2013.01);
(Continued)

(58) Field of Classification Search
CPC .......... G06F 3/013; G06F 21/32; G06F 21/31; G06F 3/017; G10L 15/22; G10L 15/223; H04L 63/0861; H04L 63/08
See application file for complete search history.

(56) References Cited

U.S. PATENT DOCUMENTS 5,704,008 A *  12/1997  Duvall, Jr. ............ B60R 25/257
                                                    704/274
7,372,370 B2 *  5/2008  Stults ...................... G08B 1/08
                                                    340/561
(Continued)

FOREIGN PATENT DOCUMENTS

EP    1699042    9/2006
EP    2028061    2/2009
EP    3470276    4/2019

OTHER PUBLICATIONS

International Search Report and Written Opinion for International Application No. PCT/US2021/030585, dated Jul. 20, 2021.
(Continued)

*Primary Examiner* — Jakieda R Jackson
(74) *Attorney, Agent, or Firm* — Taylor English Duma L.L.P.

(57) ABSTRACT

Systems and methods are disclosed herein for implementation of a vehicle command operation system that may use multi-modal technology to authenticate an occupant of the vehicle to authorize a command and receive natural language commands for vehicular operations. The system may utilize sensors to receive data indicative of a voice command from an occupant of the vehicle. The system may receive second sensor data to aid in the determination of the corresponding vehicular operation in response to the received command. The system may retrieve authentication data for the occupants of the vehicle. The system authenticates the occupant to authorize a vehicular operation command using a neural network based on at least one of the first sensor data, the second sensor data, and the authentication data. Responsive to the authentication, the system may authorize the operation to be performed in the vehicle based on the vehicular operation command.

22 Claims, 11 Drawing Sheets

(51) Int. Cl.
| | |
|---|---|
| B60R 25/25 | (2013.01) |
| B60R 25/30 | (2013.01) |
| G05B 13/02 | (2006.01) |
| G06N 3/08 | (2023.01) |
| G10L 17/00 | (2013.01) |
| G10L 17/06 | (2013.01) |
| G10L 17/18 | (2013.01) |
| G06V 10/25 | (2022.01) |
| G06V 20/59 | (2022.01) |

(52) U.S. Cl.
CPC ........... *G05B 13/027* (2013.01); *G06F 21/32* (2013.01); *G06N 3/08* (2013.01); *G06V 10/25* (2022.01); *G06V 20/59* (2022.01); *G10L 17/00* (2013.01); *G10L 17/06* (2013.01); *G10L 17/18* (2013.01)

(56) References Cited

U.S. PATENT DOCUMENTS

| | | | | |
|---|---|---|---|---|
| 10,674,003 | B1* | 6/2020 | Kang | H04M 1/72433 |
| 10,885,698 | B2 | 1/2021 | Muthler et al. | |
| 11,023,786 | B2* | 6/2021 | Hiroki | G06V 40/11 |
| 11,145,294 | B2* | 10/2021 | Vescovi | G10L 15/1815 |
| 11,180,098 | B2* | 11/2021 | Wheeler | H04R 19/04 |
| 2005/0071159 | A1* | 3/2005 | Boman | G10L 21/0208 704/233 |
| 2005/0275505 | A1* | 12/2005 | Himmelstein | B60R 25/241 704/E15.045 |
| 2012/0054028 | A1* | 3/2012 | Tengler | G06Q 30/02 701/438 |
| 2013/0145360 | A1* | 6/2013 | Ricci | G06K 9/00362 717/174 |
| 2013/0183944 | A1* | 7/2013 | Mozer | H04L 12/2818 455/414.1 |
| 2013/0200995 | A1* | 8/2013 | Muramatsu | G06F 3/017 340/5.51 |
| 2015/0110287 | A1* | 4/2015 | Holdren | G06F 3/167 381/86 |
| 2015/0348554 | A1* | 12/2015 | Orr | G05B 15/02 704/275 |
| 2016/0028730 | A1* | 1/2016 | Natarajan | A63F 13/537 726/6 |
| 2016/0098088 | A1* | 4/2016 | Park | B60K 35/00 345/156 |
| 2016/0288796 | A1* | 10/2016 | Yuan | B60R 25/01 |
| 2017/0061110 | A1* | 3/2017 | Wright | G07F 19/201 |
| 2017/0185362 | A1* | 6/2017 | Cansino | G06F 3/1423 |
| 2017/0236512 | A1* | 8/2017 | Williams | H04R 3/12 381/79 |
| 2017/0345420 | A1* | 11/2017 | Barnett, Jr. | G10L 15/1815 |
| 2018/0012433 | A1* | 1/2018 | Ricci | B60R 25/102 |
| 2018/0103022 | A1* | 4/2018 | Tokunaga | H04L 63/0853 |
| 2018/0154899 | A1* | 6/2018 | Tiwari | G05D 1/0217 |
| 2018/0176112 | A1* | 6/2018 | McLaughlin | H04L 63/061 |
| 2018/0233139 | A1* | 8/2018 | Finkelstein | G10L 15/08 |
| 2018/0285062 | A1* | 10/2018 | Ulaganathan | G10L 15/07 |
| 2018/0314689 | A1* | 11/2018 | Wang | G10L 15/1822 |
| 2019/0019516 | A1* | 1/2019 | Van Hoecke | G10L 15/22 |
| 2019/0054874 | A1* | 2/2019 | Breed | G01F 23/2962 |
| 2019/0092169 | A1* | 3/2019 | Thurimella | B60K 35/00 |
| 2019/0219976 | A1* | 7/2019 | Giorgi | H04L 63/105 |
| 2019/0362725 | A1* | 11/2019 | Himmelstein | B60R 25/257 |
| 2020/0023856 | A1 | 1/2020 | Kim et al. | |
| 2020/0047687 | A1* | 2/2020 | Camhi | G10L 15/22 |
| 2020/0135190 | A1* | 4/2020 | Kaja | B60K 35/00 |
| 2020/0216088 | A1* | 7/2020 | Shin | G06V 40/165 |
| 2020/0218442 | A1* | 7/2020 | Shin | G06F 3/013 |
| 2020/0269848 | A1* | 8/2020 | Kang | G06N 20/00 |
| 2020/0321000 | A1* | 10/2020 | Kurihara | B60R 25/257 |
| 2020/0356754 | A1* | 11/2020 | Chen | G06F 21/32 |
| 2020/0388285 | A1* | 12/2020 | Spiewla | G10L 15/26 |
| 2021/0035571 | A1* | 2/2021 | Yun | G10L 15/08 |
| 2021/0105619 | A1* | 4/2021 | Kashani | G06K 9/00832 |
| 2021/0312915 | A1* | 10/2021 | Shaked | G10L 15/20 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Avadhanam, Niranjan; International Preliminary Report on Patentability for PCT Application No. PCT/US2021/030585, filed May 4, 2021; dated Nov. 17, 2022, 9 pgs.

\* cited by examiner

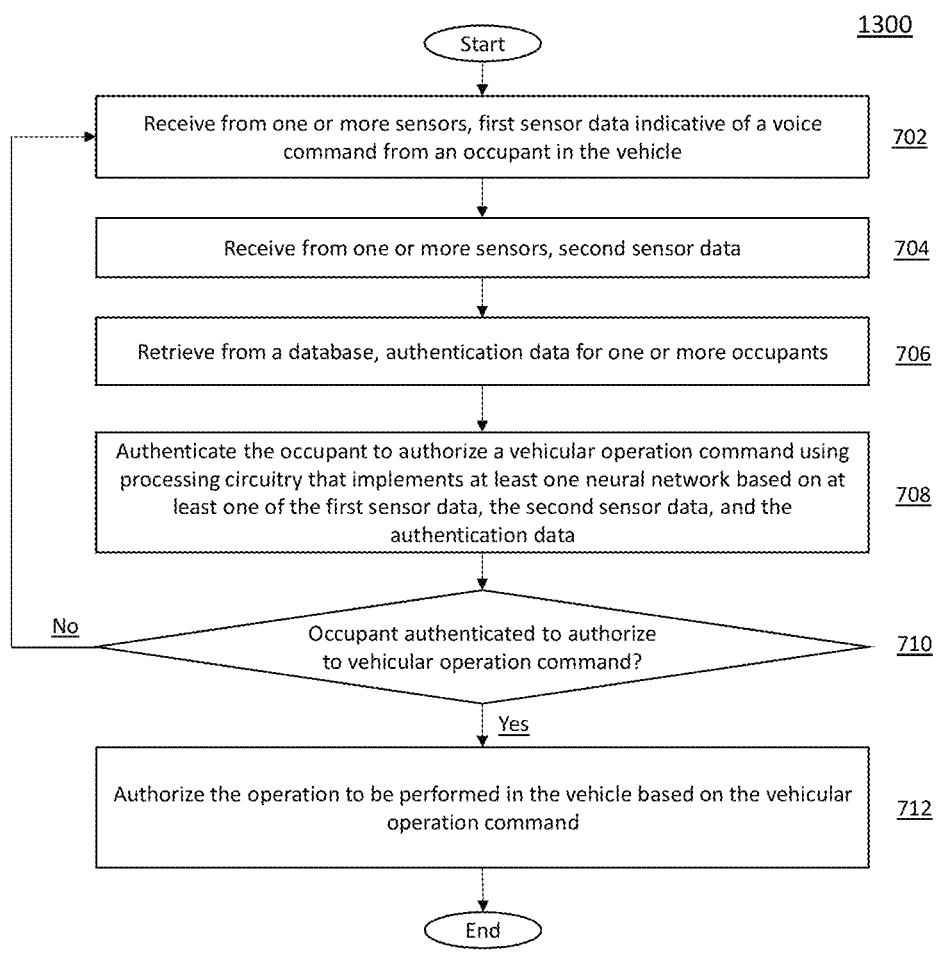

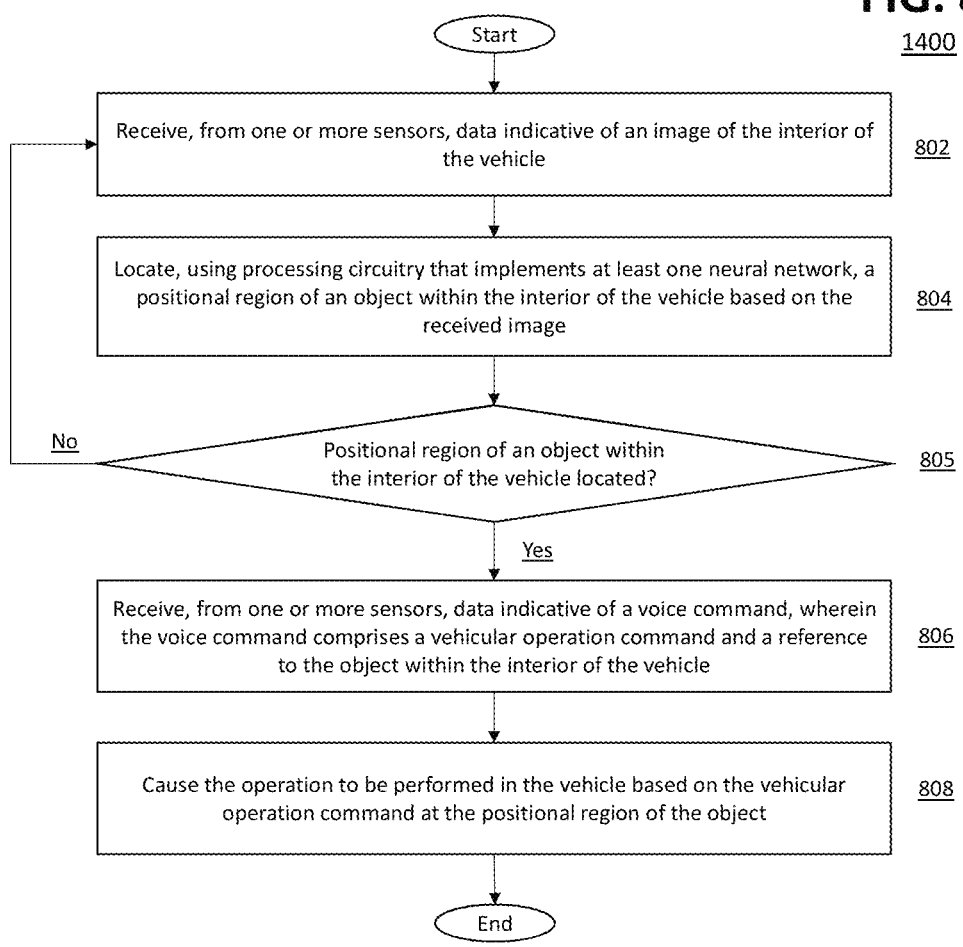

SYSTEMS AND METHODS FOR PERFORMING COMMANDS IN A VEHICLE USING SPEECH AND IMAGE RECOGNITION

BACKGROUND

The present disclosure is directed to techniques for operating a vehicle, specifically techniques for performing commands using speech and image recognition.

SUMMARY

Vehicle systems may implement voice commands to perform specific vehicle operations. In a particular approach, the system may require a physical button to be pressed by an occupant to engage the system to receive a voice command. This assumes that the occupant of the vehicle pushing the button (e.g., the driver pressing the button on the steering wheel) is authorized to provide a voice command. This approach is deficient in a scenario where other occupants are authorized to initiate a voice command, but cannot press the button due to lack of physical access, or where different levels of authorization are desired depending on the person issuing the command. Moreover, current approaches require the command to include specific preprogrammed nomenclature of the vehicle system (e.g., a voice command may recite "lower the right-rear window"). This approach is deficient when occupants do not know the specific preprogramed nomenclature and instead express commands using natural language.

Accordingly, to overcome the limitations of current voice command systems for vehicles, systems and methods are described herein for a vehicle command operation system that may use multi-modal technology to authenticate an occupant of the vehicle to authorize a command and receive natural language commands for vehicular operations. The system may utilize sensors to receive data indicative of a voice command from an occupant of the vehicle. For example, the system may receive a voice command "lower Sally's window" from a first sensor such as a microphone. This particular voice command has a vehicular operation command to lower a window, but the vehicle may not immediately know which window to lower as it has not yet determined which window is Sally's window. The system may receive second sensor data to aid in the determination of the correct vehicular operation to execute in response to the received command. For example, the system may receive data indicative of an image of the interior of the car from an interior camera sensor mounted above the rear-view mirror. From this image, the system may determine that Sally is sitting beside the rear passenger window.

The system may retrieve authentication data (e.g., from a database) for the occupants of the vehicle. Using this authentication data, along with the first and second sensor data, the system may utilize a neural network to authenticate the occupant to authorize a vehicular operation command. For example, the system may retrieve data from the database indicating the primary operator of the vehicle and their visual indication of the primary operator. The system may then determine, based on the image of the interior, which includes the primary operator and the voice signature of the occupant, that the occupant who provided the voice command is generally the primary operator of the vehicle. The primary operator of the vehicle has an assigned permissions level to authorize lowering the rear passenger window. The system may then, responsive to the authentication, authorize the operation to be performed in the vehicle based on the vehicular operation command. For example, in response to the system authenticating the primary operator to issue the command to lower Sally's window, the system provides instruction to lower the rear passenger window (which is proximate to where Sally is sitting).

In some embodiments, the authentication data may include audio fingerprints of the occupants of the vehicle. For example, a database containing audio fingerprints of various occupants may be used for comparative analysis to receive voice commands from an occupant in the vehicle.

In some embodiments, the voice command may include a vehicular operation command and a reference to an object within the interior of the vehicle. The reference to the object within the interior of the vehicle may be a descriptor. In some embodiments, the descriptor may include at least one of a name of the object, a colloquial name of the object, a shorthand name of the object, and a related descriptor of the object in a different language than that of the voice command interface. For example, a voice command may be received stating "turn up Sally's AC." In this example, "AC" is a shorthand name for air-conditioning.

In some embodiments, a neural network may be trained with a data set including historical association with the vehicle. For example, sensor data (e.g., microphone sensor data and image data by one or more camera sensors) used during operations of the vehicle may be used as a training data set to identify occupants and objects surrounding the occupants within the vehicle (e.g., chairs, windows, etc.). For example, the neural network may determine that Sally has sat in the rear passenger seat for over 90% of trips in this vehicle.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 7 is an illustrative flowchart of performance an operation in a vehicle based on a vehicular operation command, in accordance with some embodiments of the disclosure; and FIG. 8 is an illustrative flowchart of performance an operation in a vehicle based on a vehicular command at a positional region of an object, in accordance with some embodiments of the disclosure.

DETAILED DESCRIPTION

Figure 1:
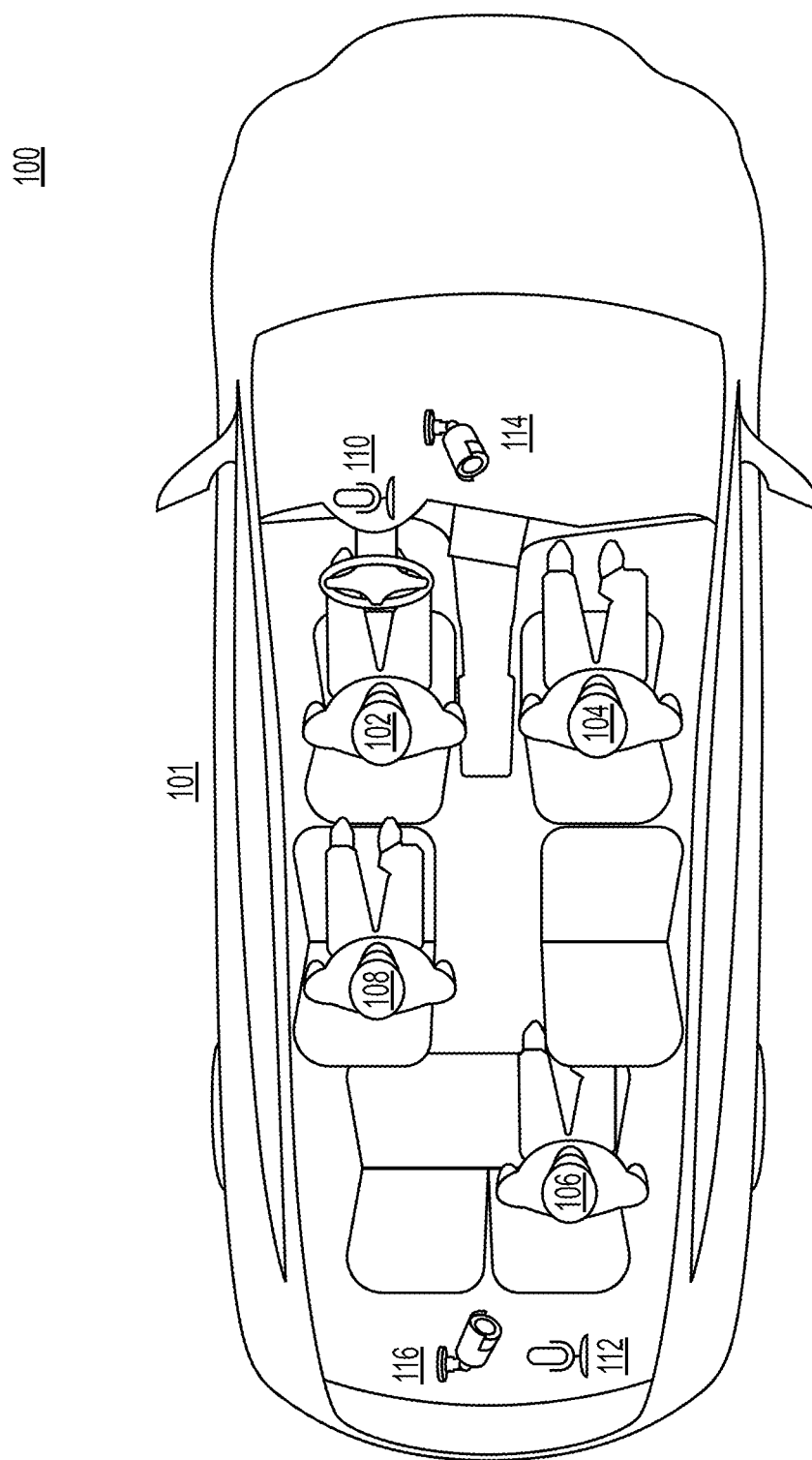
FIG. 1 depicts an example scenario of a top-down interior view of a vehicle with seated occupants and multimodal sensors, in accordance with some embodiments of the disclosure.

FIG. 1 depicts an example scenario 100 of a top-down interior view of a vehicle with seated occupants and multimodal sensors, in accordance with some embodiments of the disclosure. The vehicle 101 has several occupants seated within the vehicle at distinct locations (e.g., occupants 102, 104, 106, and 108 respectively). The vehicle includes a variety of multimodal sensors. For example, the vehicle includes two interior cameras 114 and 116 and two interior microphones 112 and 114. The vehicle may include any other types of sensors including, but not limited to, global navigation satellite systems ("GNSS") sensor(s) (e.g., Global Positioning System sensor(s)); RADAR sensor(s); ultrasonic sensor(s); LIDAR sensor(s); inertial measurement unit ("IMU") sensor(s) (e.g., accelerometer(s), gyroscope(s), magnetic compass(es), magnetometer(s), etc.); microphone(s); stereo camera(s); wide-view camera(s) (e.g., fisheye cameras); infrared camera(s); surround camera(s) (e.g., 360 degree cameras); long-range cameras; mid-range camera(s); speed sensor(s); vibration sensor(s); steering sensor(s); brake sensor(s) (e.g., as part of brake sensor system); temperature sensor(s); scent recognition sensor(s); and/or other sensor types. The orientation and/or positioning of the sensors may be of any configuration allowing the sensors to receive respective data.

Figure 2:
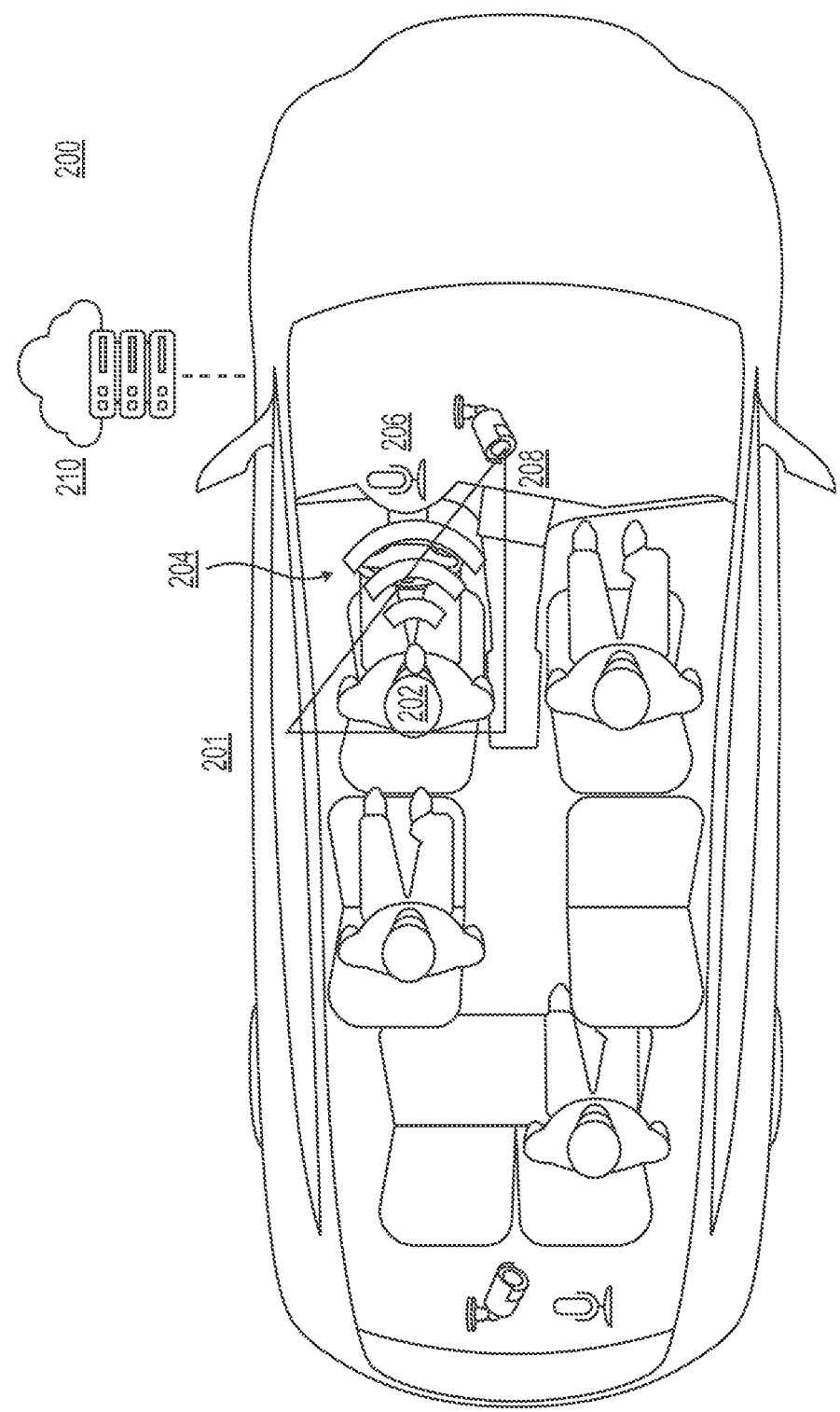
FIG. 2 depicts an example scenario of a top-down interior view of a vehicle with a system receiving a voice command, in accordance with some embodiments of the disclosure.

FIG. 2 depicts an example scenario 200 of a top-down interior view of a vehicle with a system receiving a voice command, in accordance with some embodiments of the disclosure. The vehicle may include processing circuitry to process data received from the multimodal sensors. In some embodiments, the processing circuitry may receive, from one or more sensors, first sensor data indicative of a voice command from an occupant in the vehicle. For example, the occupant in the driver's seat 202 of the vehicle 201 may issue a voice command 204 received by the microphone sensor 206. In some embodiments, the microphone sensor may be positioned within the vehicle to receive voice commands from any occupant, regardless of whether the occupant specifically directs their speech at the microphone. For example, the type of microphone sensor may be an omnidirectional microphone capable of accurately receiving sound data from any occupant within the interior of the vehicle. In some embodiments, the first sensor may be a camera sensor 208. The sensor data received from the camera sensor may then be analyzed by the processing circuitry for lip activity of the occupant to determine a voice command from the occupant. Lip activity may be parsed by the processing circuitry using various lip-activity techniques to parse speech. The processing circuitry may then determine the voice command from the parsed speech. For example, a camera may be used solely, or in combination with the microphone sensor, to corroborate the parsed voice command captured by the microphone sensor. Alternatively, the processing circuitry may utilize the microphone sensor data to corroborate the parsed voice command captured by the camera sensor.

In some embodiments, the processing circuitry may perform speech recognition algorithms to parse the received first sensor data into recognizable words in a specific language. In other embodiments, the processing circuitry may implement automatic speech recognition techniques to retrieve words in association with the first sensor data indicative of a voice command. In some embodiments, the first sensor data may be non-lexical utterances. For example, a received voice command may contain an audio signature similar to a sneeze. In certain configurations, the processing circuitry may associate this non-lexical utterance with a lexical utterance of "lower my window," where the "my" is in association with the occupant who sneezed. In some embodiments, this association may be implemented by a lookup table. In other embodiments, the association may be created by a machine learning model (e.g., a neural network) that is trained on non-lexical utterances and corresponding actions following in short temporal proximity.

The processing circuitry may receive, from one or more sensors, second sensor data. The second sensor data may be from any type of sensor associated with the vehicle including, but not limited to global navigation satellite systems ("GNSS") sensor(s) (e.g., Global Positioning System sensor(s)); RADAR sensor(s); ultrasonic sensor(s); LIDAR sensor(s); inertial measurement unit ("IMU") sensor(s) (e.g., accelerometer(s), gyroscope(s), magnetic compass(es), magnetometer(s), etc.); microphone(s); stereo camera(s); wide-view camera(s) (e.g., fisheye cameras); infrared camera(s); surround camera(s) (e.g., 360 degree cameras); long-range cameras; mid-range camera(s); speed sensor(s); vibration sensor(s); steering sensor(s); brake sensor(s) (e.g., as part of brake sensor system); temperature sensor(s); scent recognition sensor(s); and/or other sensor types. For example, the vehicle 201 may receive data from a camera 208 mounted in the interior of the vehicle. The data from the camera sensor may include a visual representation of an interior of the vehicle. In this example, the data includes, at least, a visual representation of the occupant 202 as shown by the triangular region from the position of the camera sensor 208. The data may also include interior aspects of the vehicle such as windows, seats, buttons, vents, interior configurations, seat belts, light exposure, objects surrounding the occupant, and other vehicular conditions detected within the interior of the vehicle. In some embodiments, the second sensor data may include a pressure sensor on a seat within the vehicle such that upon a passenger sitting on a seat, the pressure sensor may determine that a threshold weight is met (e.g., weight of an average human) and thus the seat is occupied.

The processing circuitry may retrieve, from a database, authentication data for one or more occupants. In some embodiments, the database may be local to the vehicle that stores authentication data for occupants of the vehicle. In other embodiments, the database may be remote from the vehicle. The database may interface with the processing circuitry via coupling of a communications network (e.g., wireless network, 4G/5G data network, or similar network). For example, the vehicle 201, by processing circuitry, communicates with a wireless cloud-based database 210 to retrieve the authentication data for one of the occupants. In some embodiments, the authentication data includes an audio fingerprint of one or more occupants. An audio fingerprint may be a condensed digital summary deterministically generated from audio data that may be used to identify an audio sample or quickly locate similar items in a set of audio data. In some embodiments, the processing circuitry may generate an audio fingerprint of one or more occupants based on speech captured from a microphone sensor within the vehicle.

The processing circuitry may authenticate the occupant to authorize a vehicular operation command based on at least one of the first sensor data and the second sensor data. In some embodiments, the processing circuitry may implement a machine learning model to authenticate the occupant. The machine learning model may be a neural network that is trained with a data set including various multimodal data for respective occupants to learn specific audio authentication and vehicular command preferences. In some embodiments, the multimodal data for training may be historical multimodal data of the vehicle. In some embodiments, the multimodal data for training may be based on preexisting multimodal data for the specific one or more sensors utilized as the first sensor and the second sensor. Any one of the first sensor data, second sensor data, and authentication data may be used as input for the neural network.

The neural network may output an authorization value. The processing circuitry determines, using the authorization value, whether the occupant is authenticated to authorize the vehicular operation command. The authorization value may be any type of value (e.g., Boolean, numeric, floating, fuzzy logic, etc.) that allows for the processing circuitry to determine authentication for the occupant. In some embodiments, the processing circuitry authenticates the voice command as the operator of the vehicle and determines that the authenticated operator is authorized to cause the operation to be performed in the vehicle.

The processing circuitry may, responsive to the authentication, authorize the operation to be performed in the vehicle based on the vehicular operation command. For example, the processing circuitry may receive a voice command to "turn on the AC" from the passenger in the vehicle. The processing circuitry receives an image of the passenger as second sensor data. The processing circuitry receives a voice fingerprint of the passenger. Using the voice fingerprint, the voice command, and the image of the passenger, the processing circuitry authenticates the passenger using a neural network as authorized to engage the AC setting within the vehicle to "on." The processing circuitry then turns on the AC setting within the vehicle.

Figure 3:
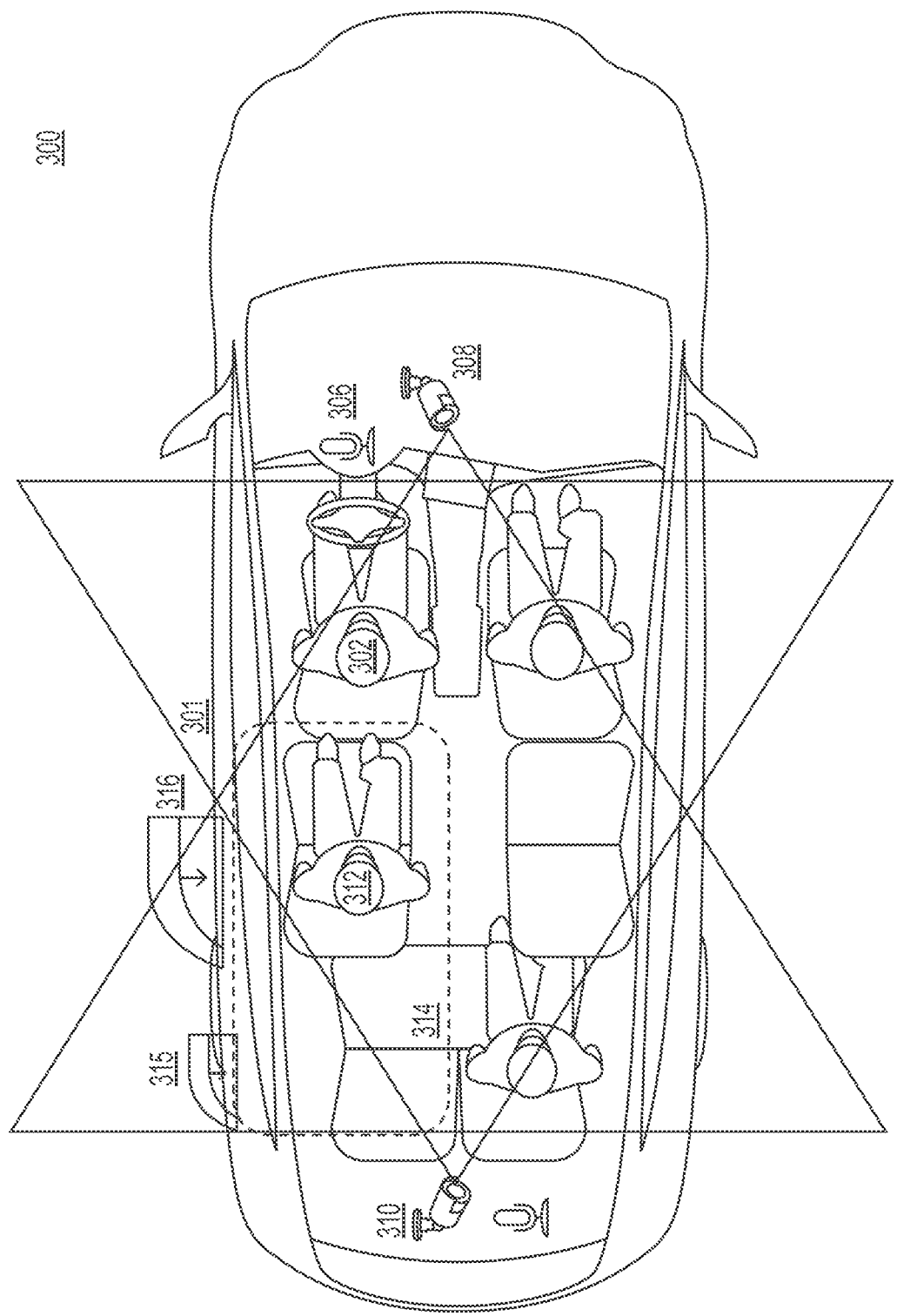
FIG. 3 depicts an example scenario of a top-down interior view of a vehicle with a system determining a vehicular operation command, in accordance with some embodiments of the disclosure.

In some embodiments, the processing circuitry may receive, from one or more sensors, data indicative of an image of the interior of the vehicle. For example, the processing circuitry may receive an image from one or more camera sensors within the vehicle. FIG. 3 depicts an example scenario 300 of a top-down interior view of a vehicle with a system determining a vehicular operation command, in accordance with some embodiments of the disclosure. The processing circuitry of the vehicle 301 receives data from front-mounted interior camera 308 and rear-mounted interior camera 310.

In some embodiments, the processing circuitry may locate, using processing circuitry that implements at least one neural network, a positional region of an object within the interior of the vehicle based on the received image. For example, the neural network may determine various objects within the vehicle including various windows of the vehicle 301 such as a rear driver-side window 316. Other examples of the processing circuitry locating objects may include locating occupant 302 in the driver's seat and occupant 312 seated in the middle row behind the driver. As stated earlier, a neural network may be trained with a data set including historical association with a vehicle to determine and/or detect objects within the vehicle. For example, sensor data (e.g., microphone sensor data and image data by one or more camera sensors) used during operations of the vehicle may be used as a training data set to identify occupants and surrounding objects (e.g., chairs, windows, etc.). For example, the neural network may determine that occupant 312 has sat at the middle row left seat for over 85% of their trips in this vehicle.

The processing circuitry may locate the positional region of an object. For example, occupant 312 has a specific associated positional region 314. The processing circuitry may determine the positional region based on an equal distribution of space started from the center of gravity of the object (or any other position within the object). In other embodiments, the positional region may be based on other factors such as the immediate environment of the object. For example, if an object (e.g., occupant of the vehicle) is sitting close to the door of the vehicle, the positional region may include only the interior region and have an unequal amount of positional space towards the interior of the vehicle. The positional region may be any measure of position such as the six degrees of freedom. In some embodiments, the positional region may be learned for the specific object by the neural network over time. For example, a particular occupant may only interact within a subset of features that is learned over time and the positional region may extend to cover only this set of features used by the particular occupant. In some embodiments, the positional region is preprogrammed for an object type which may be applied to a plurality of objects. For example, any occupant of a plurality of occupants may be designated a specific positional region.

In some embodiments, the processing circuitry may receive, from one or more sensors, data indicative of a voice command, wherein the voice command comprises a vehicular operation command and a reference to the object within the interior of the vehicle. For example, the processing circuitry may receive a voice command from occupant 302 via the microphone sensor 306 reciting "Lower Sally's window." In this example, the vehicular operation command is to lower a window of the vehicle. The reference to an object within the vehicle is the term "Sally," which the neural network determines corresponds to occupant 312. Sally is seated in the middle row of the vehicle, and she is within a positional region 314 next to objects such as window 316. In some embodiments, the voice command is of an authenticated operator of the vehicle (e.g., a driver, or the owner of the vehicle, etc.). In some embodiments, the authenticated operator is authorized to cause the operation to be performed in the vehicle. In some embodiments, the reference to the object comprises a descriptor associated with the object. The descriptor associated with the object may be a synonym of the object, a colloquial phase of the object, a shorthand name of the object, and/or a related descriptor of the object in a different language than that of the voice command interface. For example, the voice command may be "Lower Sal's window." Sal may be a nickname for Sally. The processing circuitry may associate this nickname by means of a lookup table where Sal is looked up in a database and the corresponding object name "Sally" is returned. In other embodiments, the processing circuitry may implement a neural network that learns how objects are commanded and/or referred to by analyzing sensor information (e.g., data from vehicle microphones) to determine which objects may have multiple names/aliases. For example, Sally may be referred to as Sal, Sal-Sal, honey, sweetie-pie, Sizzy, and/or Lee as determined from two months of microphone sensor input from the vehicle.

In some embodiments, the processing circuitry may cause the vehicular operation to be performed in the vehicle based on the vehicular operation command at the positional region of the object. For example, the processing circuitry may lower the window 316 that is within a positional region 314 of the object (Sally—occupant 312). The processing circuitry may implement machine learning (e.g., a neural network) to determine which operation is to be performed given the positional region of the object and the voice command. For example, there may be ambiguity that can be resolved by either having the neural network selecting the operation with highest predictive likelihood, or alternatively, request further information from the occupant regarding the proposed vehicular operation command. For example, there may be a window directly parallel adjacent to the sitting position of occupant 312, while a second window 315 may exist behind occupant 312 in the rear left corner of the vehicle. The processing circuitry may determine that the positional region covers both windows. The processing circuitry may determine, optionally based on a neural network, that only the window directly parallel (e.g., window 316) will be lowered, while leaving window 315 closed. In some embodiments, if ambiguity exists in the instruction of the voice command, the processing circuitry may cause the operation to be performed in the vehicle based on historical information associated with the particular object and/or based on an aggregate set of data for the vehicular operation. For example, if 90% of the voice commands of the object have been to lower the rear left window, the processing circuitry may select this is the vehicular operation over another potential operation within the positional region of the object that may be relevant given the voice command.

Figure 4:
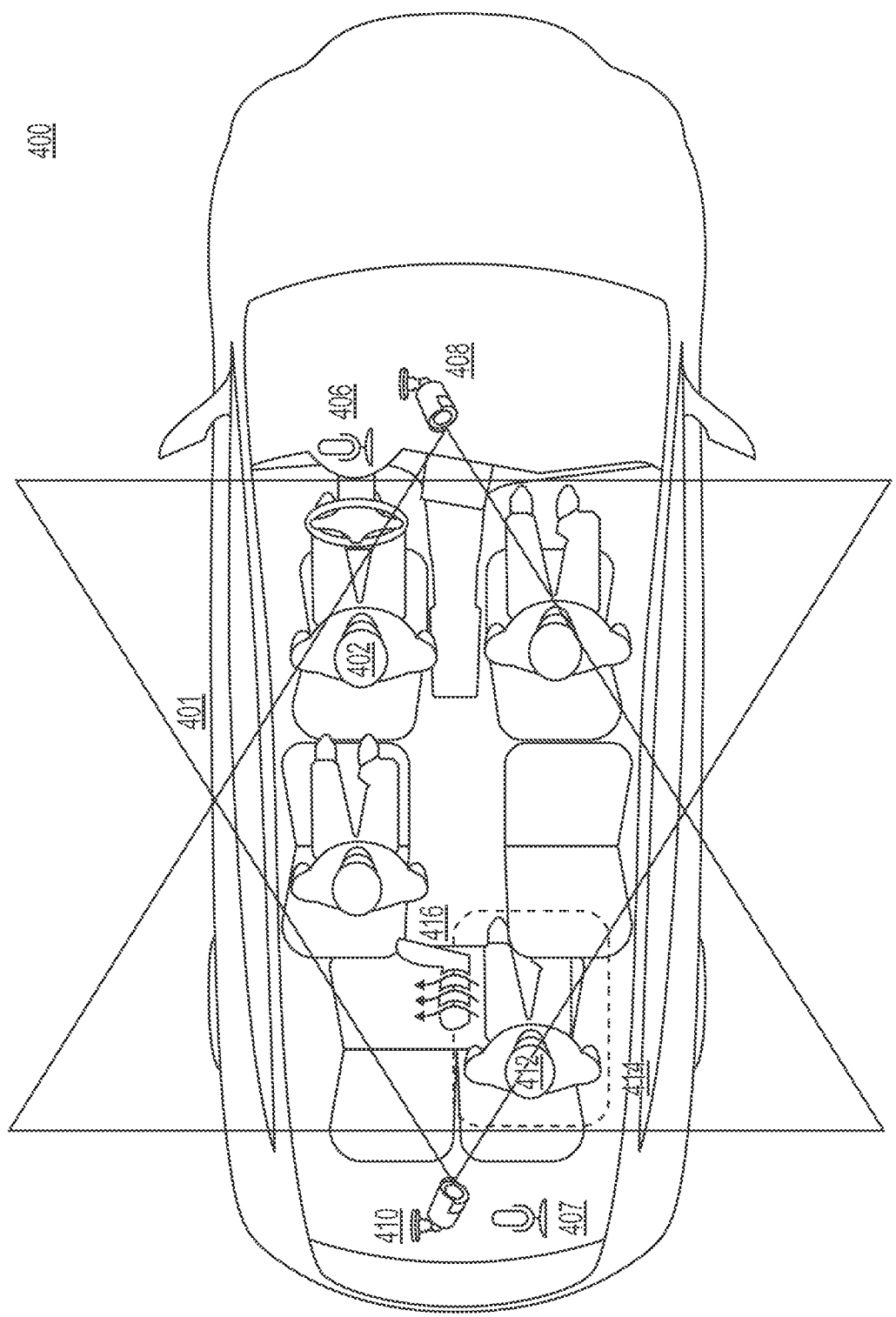
FIG. 4 depicts an example scenario of a top-down interior view of a vehicle with a system determining another vehicular operation command, in accordance with some embodiments of the disclosure.

FIG. 4 depicts an example scenario 400 of a top-down interior view of a vehicle with a system determining another vehicular operation command, in accordance with some embodiments of the disclosure. The processing circuitry receives two images of the interior of the vehicle 401 from camera sensors 408 and 410. The processing circuitry determines that the interior of the vehicle includes numerous occupants (including driver 402 and rear right passenger 412), seats, windows, and other objects. The processing circuitry determines that seat objects have a plurality of respective vehicular operations, including heating and cooling. The processing circuitry locates the rear right seat and determines a positional region of the seat 414. The processing circuitry then receives a voice command from occupant 412 via the microphone sensors 406 and 407 reciting "Turn on my seat warmers." The voice command includes a vehicular operation command to engage seat warmers 416, which are a function of the seat object, and a reference to the object, namely occupant 412, using the pronoun "my." The processing circuitry determines that the seat is within the positional region 414 of the occupant 412 and engages the seat warmers.

Figure 5A:
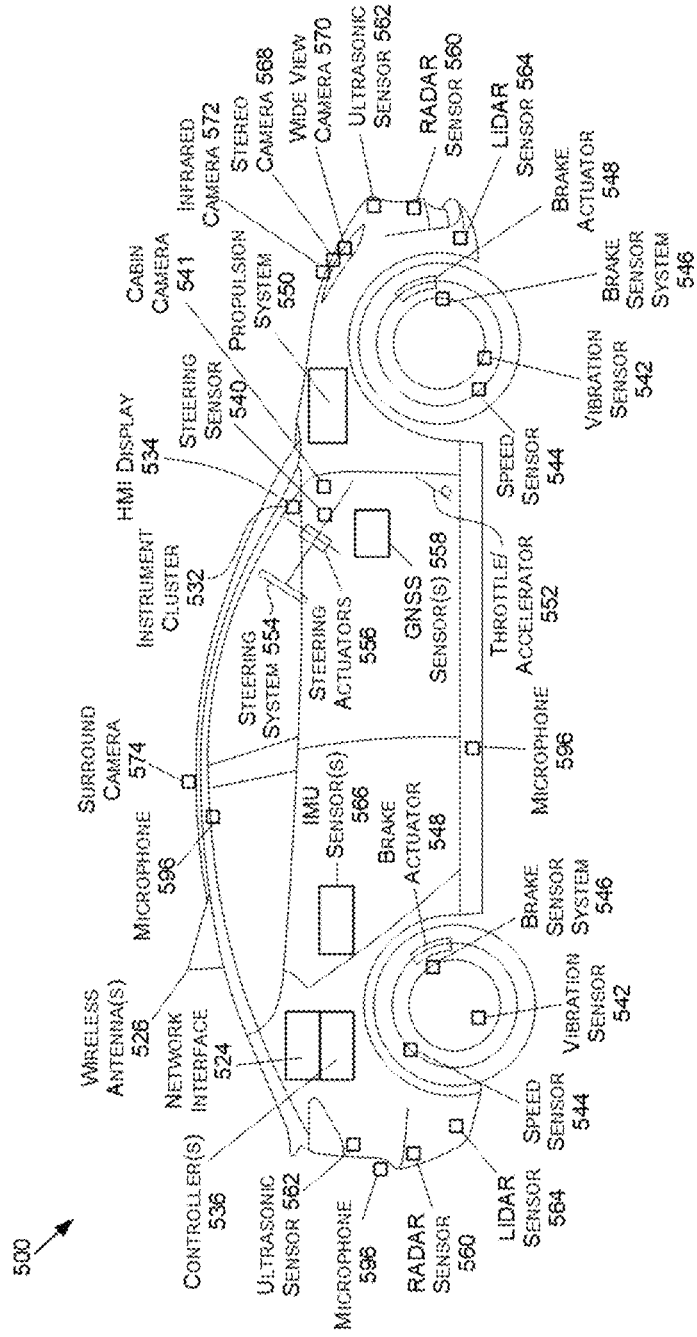
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive EngineersRoad (SAE) "Taxonomy and Definitions for Terms Related to Driving Automation Systems for On- Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more CPU(s), system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, and/or to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) 546 (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the location of the vehicle 500, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524, which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
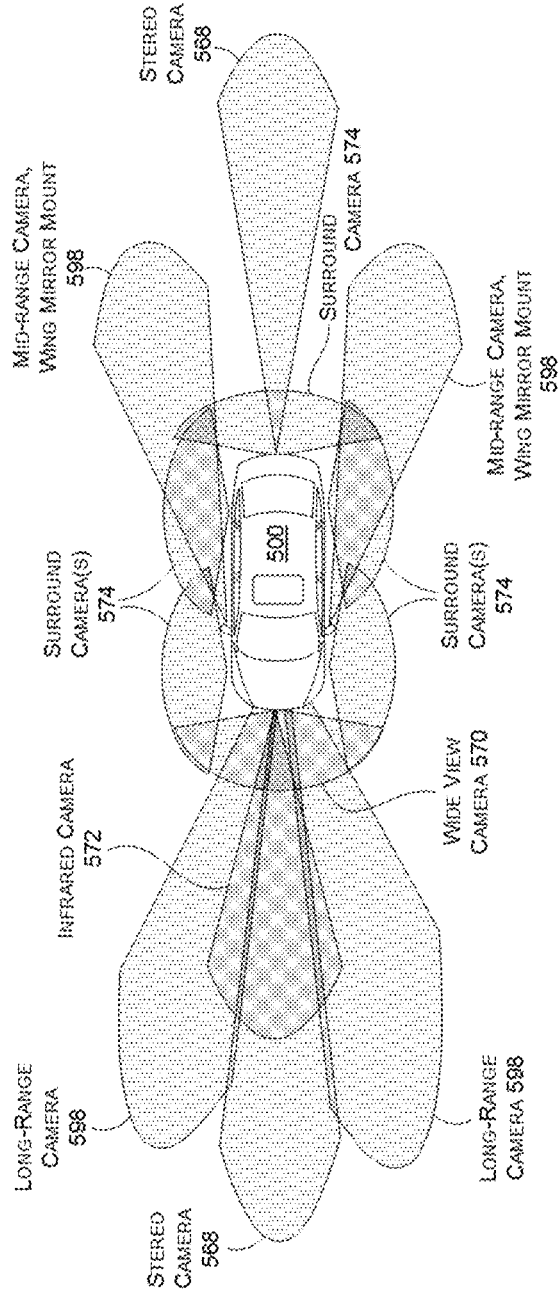
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500. The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 500 (e.g., front-facing cameras) may be used for surround view, to help identify forward-facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that includes portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned around the vehicle 500. The surround camera(s) 574 may include wide-view camera(s) 570, fisheye camera(s), 360-degree camera(s), and/or the like. For example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround-view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Cameras with a field of view that include portions of the interior or cabin of vehicle 500 may be used to monitor one or more states of drivers, passengers, or objects in the cabin. Any type of camera may be used including, but not limited to, cabin camera(s) 541, which may be any type of camera described herein, and which may be placed anywhere on or in vehicle 500 that provides a view of the cabin or interior thereof. For example, cabin camera(s) 541 may be placed within or on some portion of the vehicle 500 dashboard, rear view mirror, side view mirrors, seats, or doors and oriented to capture images of any drivers, passengers, or any other object or portion of the vehicle 500.

Figure 5C:
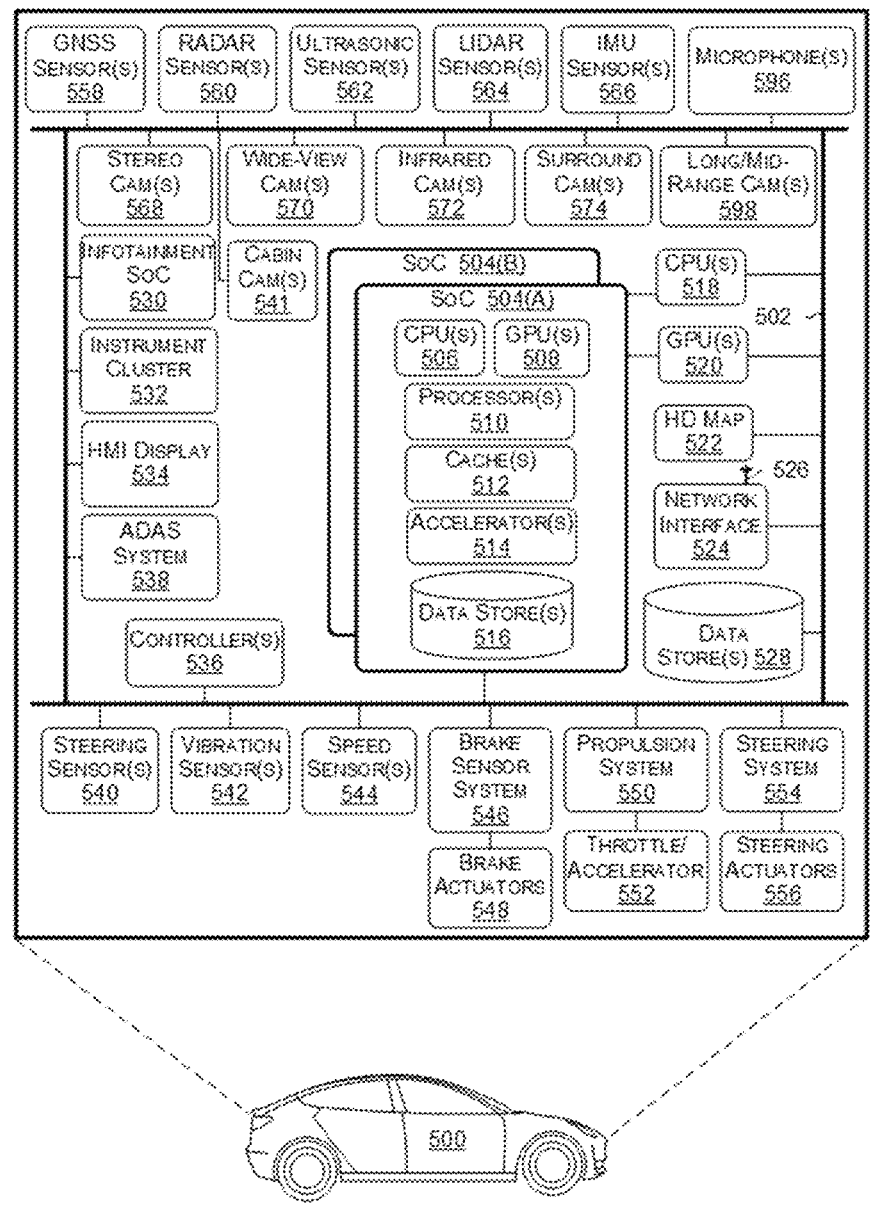
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C is illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500 and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use computer-based application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting, and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected to both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe-stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and actively performing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role. The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always-on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, which use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include an SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols. The vehicle 500 may further include data store(s) 528, which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558(e.g., GPS and/or assisted GPS sensors), to assist in mapping, perception, occupancy grid generation, and/or path planning functions. Any number of GNSS sensor(s) 558 may be used, including, for example and without limitation, a GPS using a USB connector with an Ethernet to serial (RS-232) bridge. The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data, in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 500 at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 100 m, with an accuracy of 2 cm-3 cm, and with support for a 100 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit. The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B. The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include an SoC, in some examples. The ADAS system 538 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjusts the vehicle speed to maintain a safe distance from vehicles ahead. Lateral ACC performs distance keeping, and advises the vehicle 500 to change lanes when necessary. Lateral ACC is related to other ADAS applications such as LC and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 500), while the I2V communication concept provides information about traffic farther ahead. CACC systems may include either or both I2V and V2V information sources. Given the information of the vehicles ahead of the vehicle 500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse. AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane. BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network that is trained and thus reduces the risk of false positives, as described herein.

The vehicle 500 may further include the infotainment SoC 530 (e.g., an in-vehicle infotainment system (IVI)). Although illustrated and described as an SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 500. For example, the infotainment SoC 530 may include radios, disk players, navigation systems, video players, USB and Bluetooth connectivity, carputers, in-car entertainment, Wi-Fi, steering wheel audio controls, hands-free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe-stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
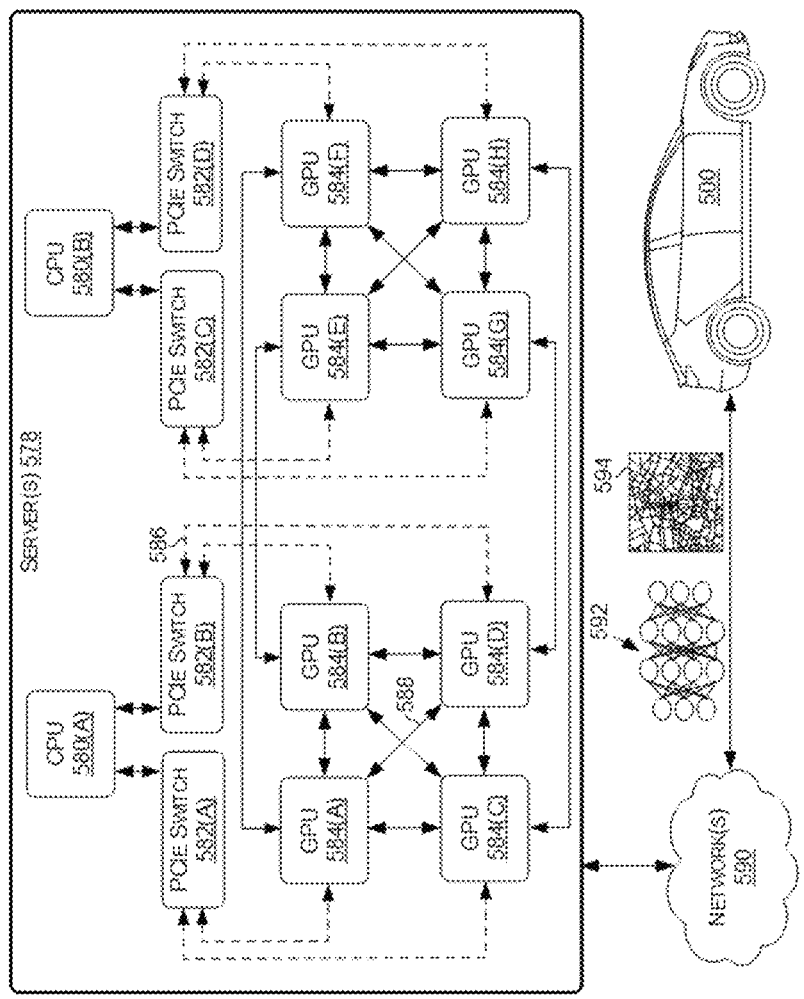
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced roadwork. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 6:
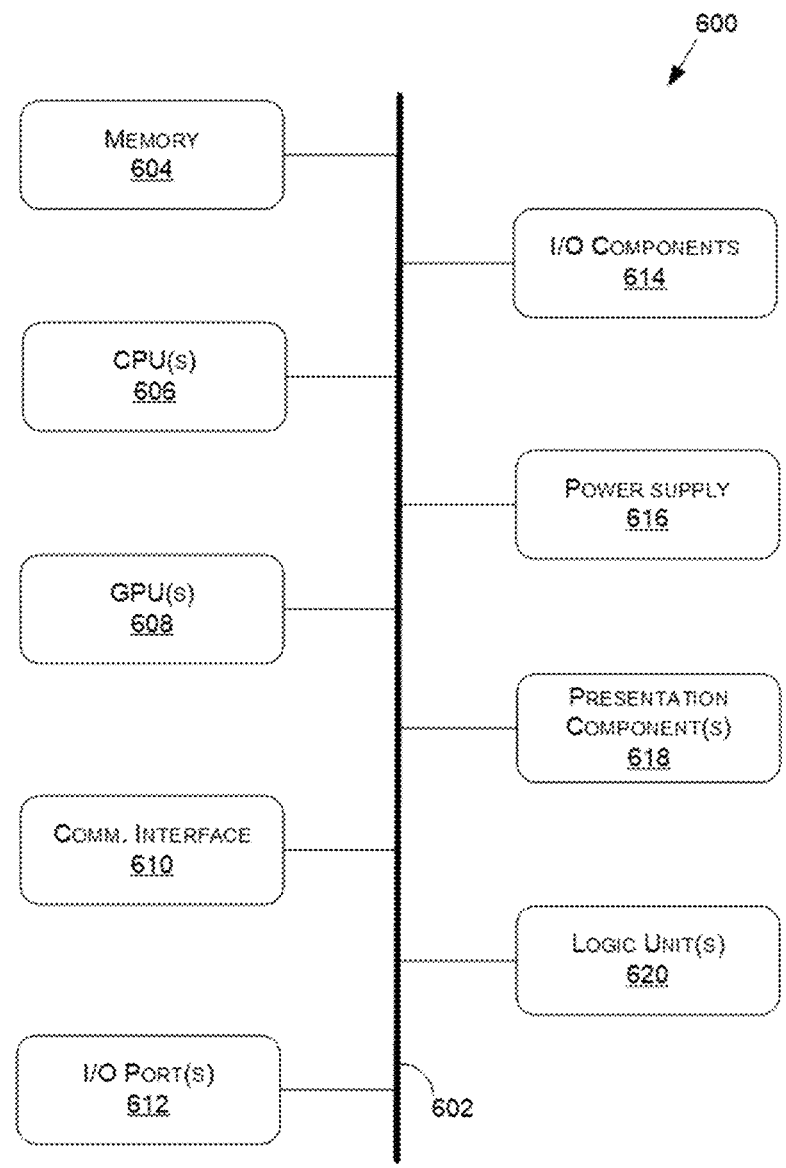
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, I/O ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point, connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs. In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, including wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built into (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate. The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

FIG. 7 is an illustrative flowchart of performance of an operation in a vehicle based on a vehicular operation command, in accordance with some embodiments of the disclosure. Process 700, and any of the following processes, may be executed by processing circuitry. Processing circuitry may include inference and/or training logic. Processing circuitry may also include one or more processors 518 and/or graphical processor units 520. Processing circuitry may also include one or more hardware accelerators (e.g., DLA(s) and/or PLA(s)). As referred to herein, processing circuitry should be understood to mean circuitry based on one or more microprocessors, microcontrollers, digital signal processors, programmable logic devices, system on chip (SoC), field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units or multiple different processors. Any type and structure of processing circuitry may be employed. For example, processing circuitry may include a multi-core processor, a multi-core processor structured as a graphics or computation pipeline for carrying out operations in parallel, a neuromorphic processor, any other parallel processor or graphics processor, or the like. In at least one embodiment, processing circuitry may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor or graphics processor, for example.

Now referring to FIGS. 7 and 8, each block of methods described in FIGS. 7 and 8, described herein, comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods of FIGS. 7 and 8 are described, by way of example, with respect to the example autonomous vehicle system of FIGS. 5A-5D. However, these methods may additionally or alternatively be executed by any one system, or any combination of systems, including, but not limited to, those described herein.

At 702, the processing circuitry receives, from one or more sensors, first sensor data indicative of a voice command from an occupant in the vehicle. In some embodiments, the processing circuitry receives first sensor data from microphone(s) 596, stereo camera(s) 568, wide-view camera(s) 570 (e.g., fisheye cameras), infrared camera(s) 572, surround camera(s) 574 (e.g., 360 degree cameras), long-range cameras (not shown in FIG. 5A), mid-range camera(s) (not shown in FIG. 5A), vibration sensor(s) 542, and/or other sensor types.

At 704, the processing circuitry receives, from one or more sensors, second sensor data. In some embodiments, the processing circuitry receives second sensor data from, at least in part, global navigation satellite systems ("GNSS") sensor(s) 558 (e.g., Global Positioning System sensor(s)), RADAR sensor(s) 560; ultrasonic sensor(s) 562; LIDAR sensor(s) 564; inertial measurement unit ("IMU") sensor(s) 566 (e.g., accelerometer(s), gyroscope(s), magnetic compass(es), magnetometer(s), etc.); microphone(s) 596; stereo camera(s) 568; wide-view camera(s) 570 (e.g., fisheye cameras); infrared camera(s) 572; surround camera(s) 574 (e.g., 360 degree cameras); long-range cameras (not shown in FIG. 5A); mid-range camera(s) (not shown in FIG. 5A); speed sensor(s) 544 (e.g., for measuring speed of vehicle 500); vibration sensor(s) 542; steering sensor(s) 540; brake sensor(s) (e.g., as part of brake sensor system 546); and/or other sensor types. In some embodiments, the processing circuitry receives data indicative of a depiction of the interior of the vehicle from one or more camera sensors mentioned above.

At 706, the processing circuitry retrieves, from a database, authentication data for one or more occupants. In some embodiments, the processing circuitry may receive the authentication from an external database via the network 590 to a server (e.g., server(s) 578, or a remote server storing authentication data). In some embodiments, the processing circuitry may retrieve the authentication data from local memory (e.g., memory 920, or similar memory stored locally within vehicle).

At 708, the processing circuitry authenticates the occupant to authorize a vehicular operation command using processing circuitry that implements at least one neural network based on at least one of the first sensor data, the second sensor data, and the authentication data. In some embodiments, the processing circuitry makes this determination by implementing a hardware accelerator to use the neural networks 592. For example, the hardware accelerator may be one or more modules from the hardware acceleration cluster. The modules from the hardware acceleration cluster include one or more DLA(s), one or more PVA(s), and/or one or more TPU(s). In some embodiments, the hardware acceleration cluster is part of the server 578. In this embodiment, data is exchanged between the processing circuitry of the vehicle and the server. In other embodiments, processing circuitry includes the processing circuitry of the server. In still other embodiments, the hardware cluster is part of SoC 504. At 710, the processing circuitry determines whether the occupant is authenticated to authorize for the vehicular operation command based on at least one of the first sensor data and the second sensor data. If, at 710, the processing circuitry determines "No," the occupant is not authenticated to authorize the vehicular operation command, the process reverts to step 702.

If, at 710, control circuitry determines "Yes," the occupant is authenticated to authorize the vehicular operation command, the process advances to step 712. At 712, the processing circuitry authorizes the operation to be performed in the vehicle based on the vehicular operation command. In some embodiments, the processing circuitry provides an instruction to a sensor of the vehicle. Specifically, the processing circuitry provides the instruction to at least one of: global navigation satellite systems ("GNSS") sensor(s) 558 (e.g., Global Positioning System sensor(s)); RADAR sensor(s) 560; ultrasonic sensor(s) 562; LIDAR sensor(s) 564; inertial measurement unit ("IMU") sensor(s) 566 (e.g., accelerometer(s); gyroscope(s); magnetic compass(es); magnetometer(s), etc.); microphone(s) 596; stereo camera(s) 568; wide-view camera(s) 570 (e.g., fisheye cameras); infrared camera(s) 572; surround camera(s) 574 (e.g., 360 degree cameras); long-range cameras (not shown in FIG. 5A), mid-range camera(s) (not shown in FIG. 5A); speed sensor(s) 544 (e.g., for measuring speed of vehicle 500); vibration sensor(s) 542; steering sensor(s) 540; brake sensor(s) (e.g., as part of brake sensor system 546); and/or other sensor types.

FIG. 8 is an illustrative flowchart 800 of performance of an operation in a vehicle based on a vehicular command at a positional region of an object, in accordance with some embodiments of the disclosure. At 802, the processing circuitry receives, from one or more sensors, data indicative of an image of the interior of the vehicle. In some embodiments, the one or more sensors include interior vehicle camera sensors. In other embodiments, the one or more sensors include stereo camera(s) 568, and/or infrared camera(s) 572.

At 804, the processing circuitry locates, using processing circuitry that implements at least one neural network, a positional region of an object within the interior of the vehicle based on the received image. In some embodiments, the processing circuitry implements a machine learning model that implements one or more of the operations using the neural networks 592 to locate a positional region of an object within the interior of the vehicle based on the received image. In some embodiments, the machine learning model uses inference and/or training logic 515 to perform the training and interference modeling of the neural networks.

The training of the neural networks uses training data set of various vehicle interior pictures with various objects within the interior of the vehicle. The training framework facilitates the learning of the neural network using the training data set. At 805, the processing circuitry determines whether the positional region of the object within the interior of the vehicle is located. If, at 805, the processing circuitry determines "No," the positional region of the object within the interior of the vehicle is not located, the process reverts to step 802.

If, at 805, control circuitry determines "Yes," the positional region of the object within the interior of the vehicle is located, the process advances to step 806. At 806, the processing circuitry receives, from one or more sensors, data indicative of a voice command, wherein the voice command comprises a vehicular operation command and a reference to the object within the interior of the vehicle. In some embodiments, the processing circuitry receives data indicative of a voice command from microphone(s) 596; stereo camera(s) 568; wide-view camera(s) 570 (e.g., fisheye cameras); infrared camera(s) 572; surround camera(s) 574 (e.g., 360 degree cameras); long-range cameras (not shown in FIG. 5A); mid-range camera(s) (not shown in FIG. 5A); vibration sensor(s) 542; and/or other sensor types. The processing circuitry may implement natural language processing and/or other parsing techniques to convert the data indicative of a voice command into parsed data.

At 808, the processing circuitry causes the operation to be performed in the vehicle based on the vehicular operation command at the positional region of the object. In some embodiments, the processing circuitry provides an instruction to a sensor of the vehicle. Specifically, the processing circuitry provides the instruction to at least one of: global navigation satellite systems ("GNSS") sensor(s) 558 (e.g., Global Positioning System sensor(s)); RADAR sensor(s) 560; ultrasonic sensor(s) 562; LIDAR sensor(s) 564; inertial measurement unit ("IMU") sensor(s) 566 (e.g., accelerometer(s); gyroscope(s); magnetic compass(es); magnetometer(s), etc.); microphone(s) 596; stereo camera(s) 568; wide-view camera(s) 570 (e.g., fisheye cameras); infrared camera(s) 572; surround camera(s) 574 (e.g., 360 degree cameras); long-range cameras (not shown in FIG. 5A); mid-range camera(s) (not shown in FIG. 5A); speed sensor(s) 544 (e.g., for measuring speed of vehicle 500); vibration sensor(s) 542; steering sensor(s) 540, brake sensor(s) (e.g., as part of brake sensor system 546); and/or other sensor types.

It is contemplated that some suitable steps or suitable descriptions of FIGS. 7 and 8 may be used with other suitable embodiments of this disclosure. In addition, some suitable steps and descriptions described in relation to FIGS. 7 and 8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 5A-6 could be used to perform one or more of the steps in FIGS. 7 and 8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, from one or more first sensors, first sensor data indicative of a voice command corresponding to a vehicular operation of a vehicle;
   determining, based at least in part on the voice command, an occupant that the voice command corresponds to;
   receiving, from one or more second sensors, second sensor data representative of one or more images of one or more fields of view of the one or more second sensors;
   determining, using a neural network, that the second sensor data represents the occupant and a component;
   determining that the component is associated with the vehicular operation based at least in part on the second sensor data representing the occupant and the component; and
   based at least in part on the component being associated with the voice command, causing the vehicular operation to be performed with respect to the component.

2. The method of claim 1, further comprising authenticating the occupant that issued the voice command, wherein the authenticating comprises determining that the occupant that issued the voice command is a primary operator of the vehicle based at least in part on the first sensor data being compared to an audio fingerprint.

3. The method of claim 1, further comprising:
   determining that the second sensor data represents the occupant and the component located within a region of an interior of the vehicle,
   wherein the determining that the component is associated with the vehicular operation is further based at least in part on the second sensor data representing the occupant and the component located within the region.

4. The method of claim 3, wherein the one or more second sensors include one or more camera sensors.

5. A method comprising:
   receiving, from one or more first sensors, data indicative of a voice command corresponding to a vehicular operation and a reference to a first occupant within an interior of a vehicle;
   receiving, from one or more second sensors, data indicative of an image of the interior of the vehicle;
   locating, using processing circuitry that implements at least one neural network, a positional region of the first occupant within the interior of the vehicle based at least in part on the image;
   retrieving, from a database, authentication data for a second occupant that issued the voice command;
   determining, based at least in part on the authentication data, the data indicative of the voice command, and the positional region of the first occupant, a component of the vehicle that the vehicular operation corresponds to; and
   causing the vehicular operation to be performed with respect to the component of the vehicle.

6. The method of claim 5, further comprising determining that the second occupant that issued the voice command is a primary operator of the vehicle by, at least in part, comparing the data indicative of the voice command to an audio fingerprint represented by the authentication data.

7. The method of claim 6, wherein the primary operator of the vehicle is authorized to cause the vehicular operation to be performed in the vehicle.

8. The method of claim 5, wherein the reference to the first occupant comprises a descriptor associated with the first occupant.

9. The method of claim 8, wherein the descriptor comprises at least one of a synonym of the first occupant, a colloquial phase of the first occupant, a shorthand name of the first occupant, or a related descriptor of the first occupant in a different language than a voice command interface.

10. The method of claim 5, wherein the neural network is trained with historical associations between components and occupants of the vehicle.

11. A system comprising:
one or more first sensors configured to generate first sensor data indicative of a voice command from a first occupant in a vehicle, the voice command corresponding to a vehicular operation;
one or more second sensors to generate second sensor data representative of one or more images of one or more fields of view of the one or more second sensors; and
parallel processing circuitry configured to:
determine, based at least in part on the voice command, that the voice command includes a reference to a second occupant of the vehicle;
determine, using a neural network and based at least in part on the second sensor data, a position of the second occupant within the vehicle;
determine, based at least in part on the position of the second occupant within the vehicle, a component associated with the vehicular operation;
retrieve, from a database, authentication data for the first occupant;
authenticate the first occupant to authorize the vehicular operation corresponding to the voice command; and
responsive to the authentication, authorize the vehicular operation to be performed with respect to the component of the vehicle.

12. The system of claim 11, wherein the authentication data comprises an audio fingerprint corresponding to the first occupant, and wherein the authentication is based at least in part on determining that the first occupant is a primary operator of the vehicle by comparing the first sensor data to the audio fingerprint.

13. The system of claim 11, wherein the second sensor data comprises a visual representation of an interior of the vehicle.

14. The system of claim 13, wherein the one or more second sensors include one or more camera sensors.

15. A system comprising:
one or more sensors configured to:
receive first sensor data indicative of an image of an interior of a vehicle; and
receive second sensor data indicative of a voice command corresponding to a vehicular operation; and
parallel processing circuitry configured to:
determine, based at least in part on a neural network, that the image depicts an occupant and a component of the vehicle;
determine, based at least in part on the image depicting the occupant and the component, that the component is associated with the vehicular operation; and
based at least in part on the component being associated with the vehicular operation, cause the vehicular operation to be performed with respect to the component.

16. The system of claim 15, wherein the parallel processing circuitry is further configured to authenticate the occupant for the voice command based at least in part on a determination that the occupant is a primary operator of the vehicle.

17. The system of claim 15, wherein the occupant that issued the voice command is authorized to cause the vehicular operation to be performed.

18. The system of claim 15, wherein:
the parallel processing circuitry is further configured to determine that the voice command includes a reference to the occupant; and
the determination that the component is associated with the vehicular operation is further based at least in part on the voice command including the reference to the occupant.

19. The system of claim 18, wherein the reference comprises at least one of a synonym of the occupant, a colloquial phase of the occupant, a shorthand name of the occupant, or a related reference of the occupant in a different language than a voice command interface.

20. The system of claim 15, wherein the neural network is trained with historical associations between components and occupants of the vehicle.

21. A non-transitory computer readable medium having instructions encoded thereon, that when executed by processing circuitry causes the processing circuitry to:
receive, from one or more first sensors, first sensor data indicative of a voice command corresponding to a vehicular operation of a vehicle;
determine, based at least in part on the voice command, an occupant that the voice command corresponds to;
receive, from one or more second sensors, second sensor data representative of one or more images of one or more fields of view of the one or more second sensors;
determine, using a neural network that the second sensor data represents the occupant located proximate to a component;
determine, based at least in part on the second sensor data representing the occupant located proximate to the component, that the component is associated with the vehicular operation; and
based at least in part on the component being associated with the vehicular operation, authorize the vehicular operation to be performed with respect to the component.

22. A non-transitory computer readable medium having instructions encoded thereon, that when executed by processing circuitry causes the processing circuitry to:
receive, from one or more first sensors, data indicative of a voice command corresponding to a vehicular operation and a reference to a first occupant within an interior of a vehicle;
receive, from one or more second sensors, data indicative of an image of the interior of the vehicle;
determine, using processing circuitry that implements at least one neural network, a positional region of the first occupant within the interior of the vehicle based at least in part on the image;

retrieve, from a database, authentication data for a second occupant that issued the voice command;

determine, based at least in part on the authentication data, the data indicative of the voice command, and the positional region of the first occupant, a component of the vehicle that the vehicular operation corresponds to; and cause the vehicular operation to be performed with respect to the component of the vehicle.

\* \* \* \* \*